United States Patent
Chamness et al.

(10) Patent No.: US 6,296,206 B1
(45) Date of Patent: Oct. 2, 2001

(54) CANTILEVER, BI-LEVEL PLATFORM SATELLITE DISPENSER

(75) Inventors: Darrell S. Chamness, La Habra; Thomas Raymond Vincent, Glendora, both of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/452,532

(22) Filed: Dec. 1, 1999

(51) Int. Cl.$^7$ ........................................ B64G 1/22
(52) U.S. Cl. ........................................ 244/158 R
(58) Field of Search ................. 244/158 R, 161, 244/137.1, 118.1

(56) References Cited

U.S. PATENT DOCUMENTS

| | | |
|---|---|---|
| 2,925,965 | 2/1960 | Pierce . |
| 2,938,686 | 5/1960 | Van Winkel et al. . |
| 2,958,260 | 11/1960 | Anderson . |
| 2,976,806 | 3/1961 | Risk et al. . |
| 3,107,616 | 10/1963 | Boaz et al. . |
| 3,380,687 | 4/1968 | Wrench et al. . |
| 3,420,470 | 1/1969 | Meyer . |
| 3,461,801 | 8/1969 | Vitale et al. . |
| 3,652,042 | 3/1972 | Weither . |
| 3,712,229 | 1/1973 | Schock . |
| 3,726,223 | 4/1973 | Moe . |
| 3,907,225 | 9/1975 | Weither . |
| 3,948,175 | 4/1976 | Bucklisch . |
| 4,044,974 | 8/1977 | Lingley et al. . |
| 4,067,308 | 1/1978 | Andersen et al. . |
| 4,106,389 | 8/1978 | Walley . |
| 4,233,882 | 11/1980 | Eichweber . |
| 4,298,178 | 11/1981 | Hujsak . |
| 4,372,216 | 2/1983 | Pinson et al. . |
| 4,444,117 | 4/1984 | Mitchell, Jr. . |
| 4,455,943 | * | 6/1984 | Pinson ................................ 102/489 |
| 4,506,852 | 3/1985 | Adams et al. . |
| 4,558,645 | 12/1985 | Boeder et al. . |
| 4,625,646 | 12/1986 | Pinson . |

(List continued on next page.)

OTHER PUBLICATIONS

Photograph of "Dispenser System developed for Starsem's Globalstar mission carries four satellites" date unknown.
Photograph of "Satellite dispenser system for Starsem is produced from aluminum and weighs 390 kg.", date unknown.

Primary Examiner—Charles T. Jordan
Assistant Examiner—Kevin Jakel
(74) Attorney, Agent, or Firm—Harness Dickey & Pierce P.L.C.

(57) ABSTRACT

A cantilever, bi-level platform satellite dispenser for supporting a plurality of independently deployable satellites in a dual platform arrangement. The dispenser includes a lower platform assembly having a center post extending therefrom. An upper platform assembly is secured to an opposite end of the center post, thus spacing the upper platform assembly elevationally from the lower platform assembly. Each of the upper and lower platform assemblies include a platform member upon which a plurality of satellites may be disposed and supported solely along bottom portions thereof. On the lower platform assembly the satellites are supported exteriorly of the center post, which enables access to the satellites on this platform even after same are secured thereto. The dispenser is lighter in weight than previously developed dispensers and eliminates the need for any external support structure to be carried by the dispenser or attached to the fairing. This enables the full fairing of the launch vehicle to be jettisoned at the appropriate time during ascent of the launch vehicle, thus significantly increasing the payload weight that may be carried into low earth orbit.

15 Claims, 12 Drawing Sheets

U.S. PATENT DOCUMENTS

| | | |
|---|---|---|
| 4,679,752 | 7/1987 | Wittmann et al. . |
| 4,750,423 * | 6/1988 | Nagabhushan .................. 89/1.51 |
| 4,854,526 * | 8/1989 | Rochefort .................. 244/158 R |
| 4,957,046 | 9/1990 | Puttock . |
| 5,040,748 | 8/1991 | Torre et al. . |
| 5,052,640 | 10/1991 | Chang . |
| 5,107,767 | 4/1992 | Schneider et al. . |
| 5,125,601 | 6/1992 | Monford, Jr. . |
| 5,152,482 | 10/1992 | Perkins et al. . |
| 5,199,672 | 4/1993 | King et al. . |
| 5,350,137 * | 9/1994 | Henley ....................... 244/158 R |
| 5,393,017 | 2/1995 | Smith et al. . |
| 5,411,226 | 5/1995 | Jones et al. . |
| 5,605,308 | 2/1997 | Quan et al. . |
| 5,613,653 | 3/1997 | Bombled et al. . |
| 5,720,450 | 2/1998 | Kanne . |
| 5,765,784 * | 6/1998 | Lapins ....................... 244/158 R |
| 5,779,195 | 7/1998 | Basuthakur et al. . |
| 5,860,624 | 1/1999 | Obry et al. . |
| 5,884,866 | 3/1999 | Steinmeyer et al. . |
| 6,138,951 * | 10/2000 | Budris et al. ................ 244/158 R |

* cited by examiner

FIG I

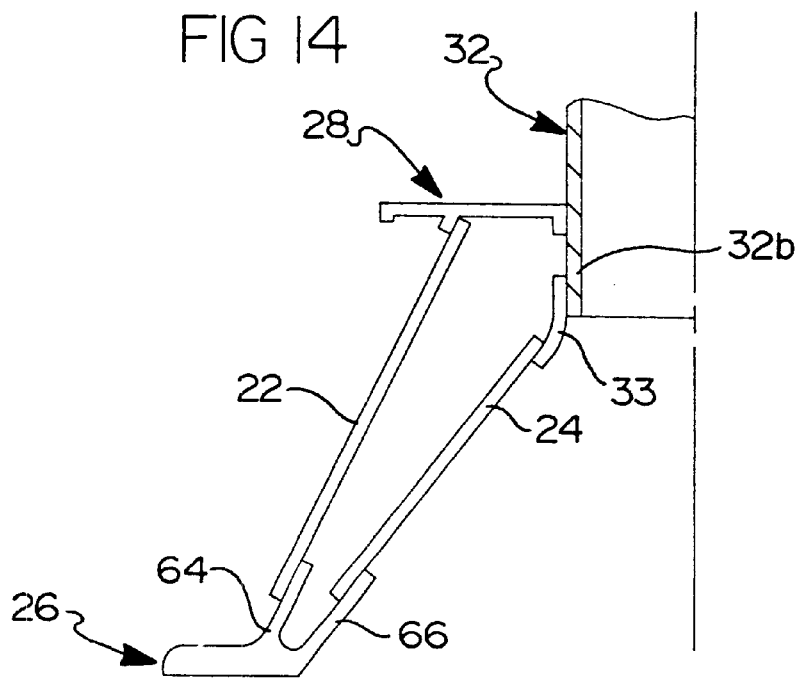
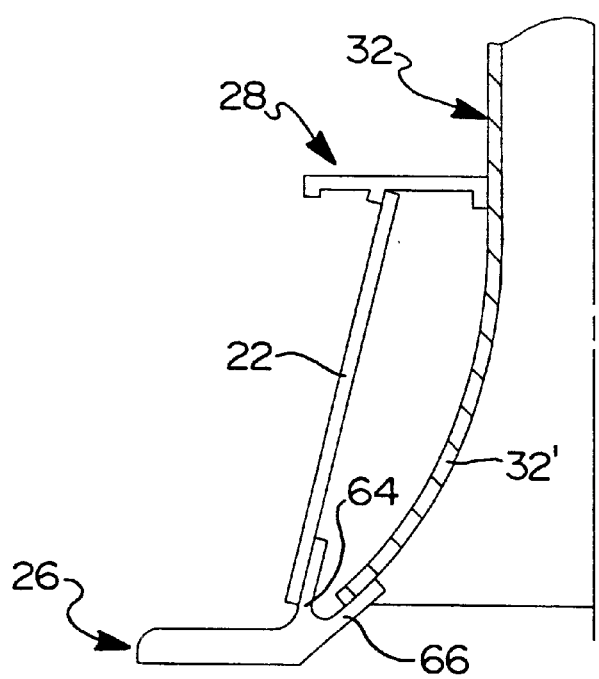

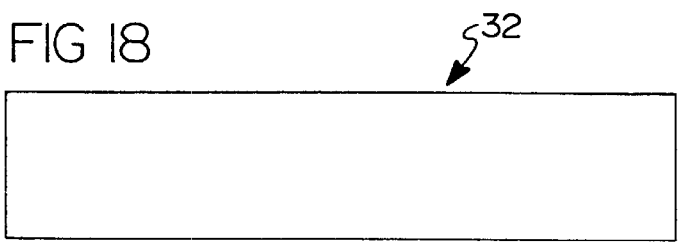
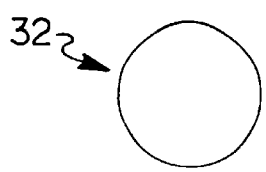
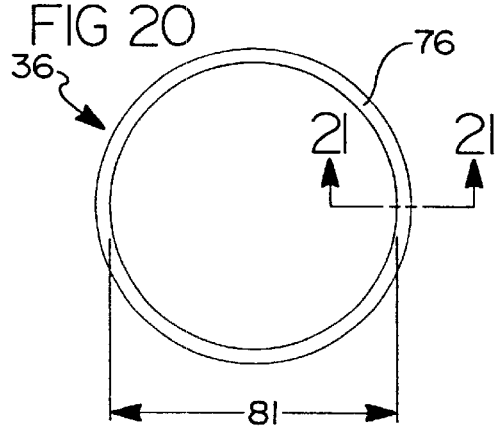
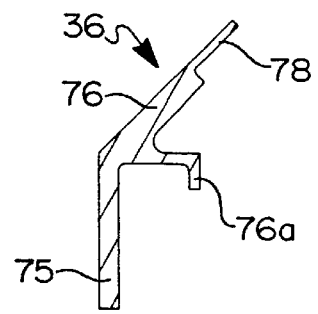
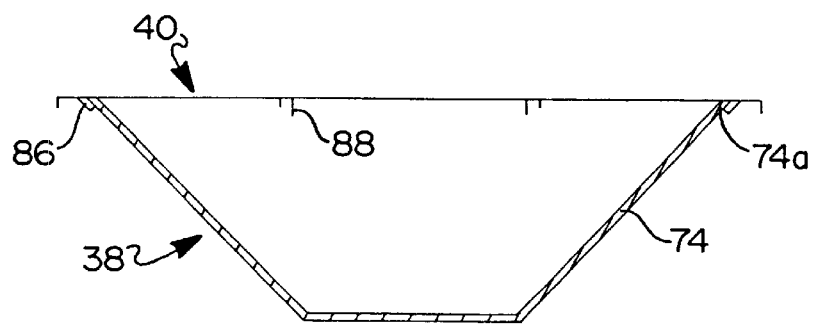

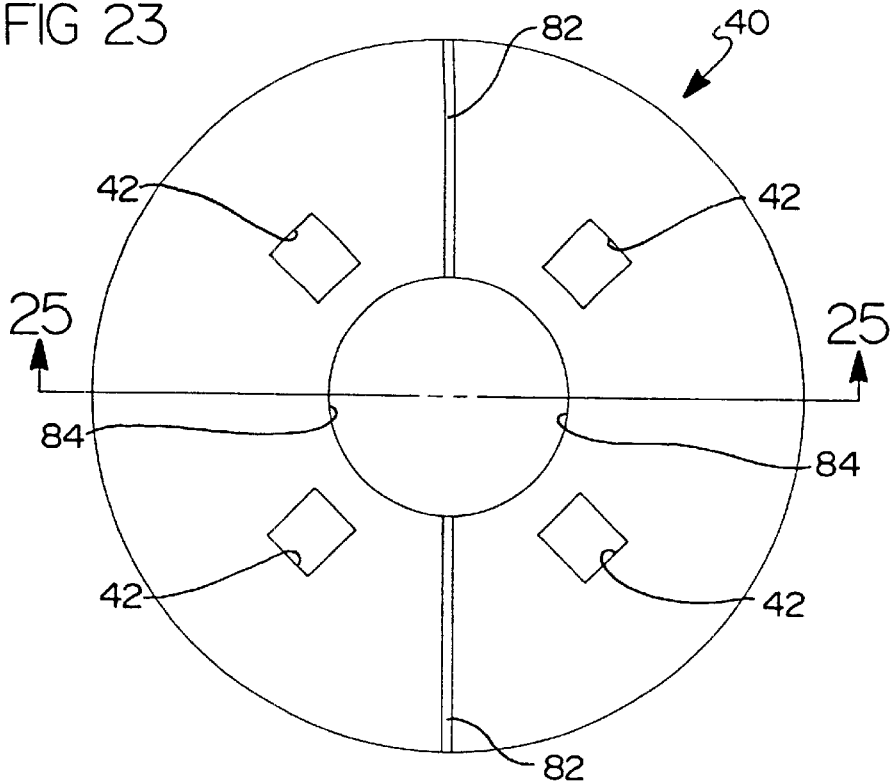
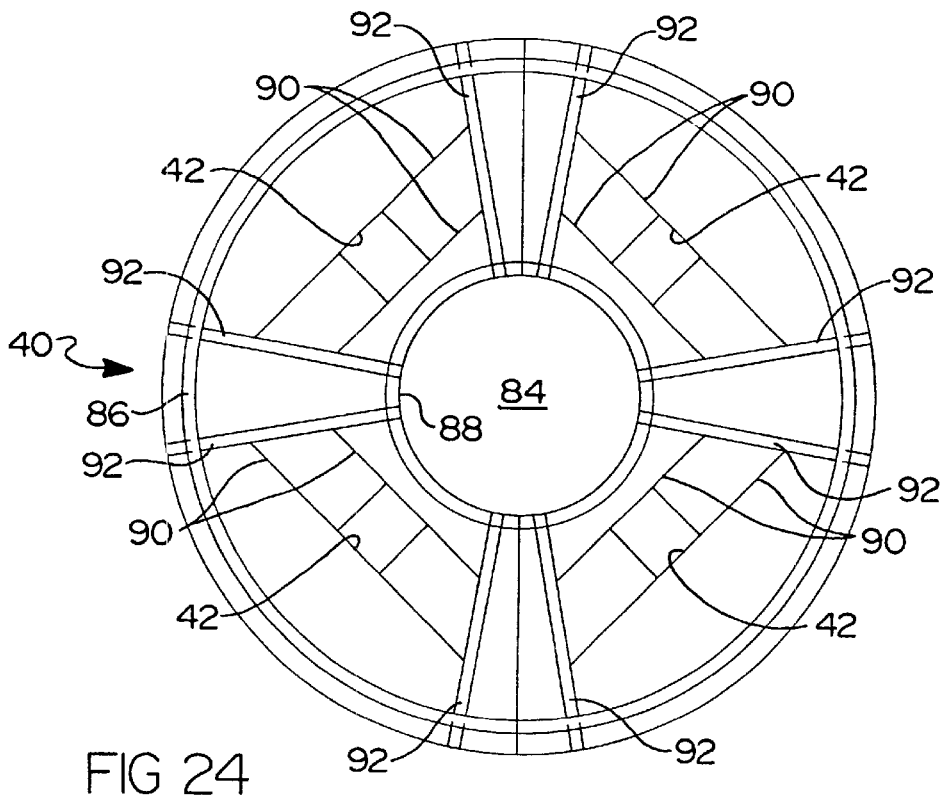

CANTILEVER, BI-LEVEL PLATFORM SATELLITE DISPENSER

TECHNICAL FIELD

This invention relates to spacecraft dispensers, and more particularly to a satellite dispenser having a cantilever, bi-level platform configuration which allows the satellites to be deployed to be supported at a lower surface of each, while significantly reducing the overall weight of the dispenser without reducing its payload capability.

BACKGROUND OF THE INVENTION

Background Art

Space vehicle dispensers are used to deploy a plurality of satellites (typically between 4–12 satellites) into low earth orbit (LEO) during a launch vehicle (LV) mission. The dispenser provides the structural link between the satellites and the launch vehicle. Typically, there are also mounted on the dispenser various electromechanical systems, including space vehicle deployment mechanisms, ordnance, and avionics lines. In some applications, it is preferred to mount the satellites at their lower surfaces on a stable, horizontal platform, rather than along a vertical surface to a central post.

With the significant expense associated with placing a plurality of satellites into low earth orbit, it is of the utmost importance that the dispenser be constructed so as to be as lightweight as possible without sacrificing structural strength, and while being able to support a plurality of independently deployable satellites thereon. One prior dispenser approach is the "Dual Manifest using external structure." In this approach, the payload fairing is split into two payload modules: an upper module and a lower module. For example, the payload fairing may be divided into a 30 foot (9.15 meter) tall lower module and a 45 foot (13.725 meter) tall upper module. Each module has its own dispenser which includes a horizontal platform for supporting a plurality of satellites thereon. During launch vehicle ascent, the upper payload fairing is jettisoned; however, the lower payload module goes into orbit. The penalty for carrying the extra payload module weight (i.e., the weight associated with the fairing of the lower payload module) to low earth orbit is less payload which can be carried into orbit. Also, the lower payload module fairing debris stays in orbit for approximately 9–12 months, which can raise the risk of damage to one or more of the deployed satellites.

Another approach is the "Dual Manifest using an internal support structure (ISS)". With this approach a full length fairing is used to encase the dispenser. Inside the full length fairing on an inner surface thereof is a slightly smaller diameter ISS with a dispenser at the bottom and on top. The ISS length is typically less than half the full fairing length, but its typical diameter (10–15 feet or 3.05–4.58 m) still represents a significant weight relative to the total payload being carried into orbit. During launch vehicle ascent, the full fairing is jettisoned. The performance gained by jettisoning the full fairing more than offsets the added weight of the ISS, thus resulting in better launch vehicle performance than the Dual Manifest using external structure approach. The drawbacks associated with using an ISS are added structural complexity and cost, as well as additional integration and operability complexities.

It is therefore a principal object of the present invention to provide a satellite dispenser for packaging a large quantity of up to about 12 or more LEO satellites in a dual platform manner while eliminating the need for an internal or external support structure associated with the dispenser, to thereby significantly reduce the overall weight of the dispenser, to thus maximize the payload capability of the dispenser.

It is still another object of the present invention to provide a satellite dispenser that allows the jettisoning of maximum fairing weight during launch vehicle ascent.

It is yet another object of the present invention to provide a satellite dispenser capable of supporting a large number of independently deployable satellites in a manner without requiring modification to presently used separation mechanisms for deploying such satellites.

It is still another object of the present invention to provide a satellite dispenser which can be constructed without additional cost over present day satellite dispenser systems and with existing manufacturing processes.

SUMMARY OF THE INVENTION

The present invention relates to a cantilever, bi-level platform satellite dispenser apparatus and method which obviates the need for internal or external support structure to be used with the dispenser. The dispenser generally comprises a lower platform assembly having a center post projecting therefrom and an upper platform assembly secured to a portion of the center post. Preferably, the upper platform assembly is secured to an upper terminal end of the center post. A first subplurality of satellites, typically between 2–6 satellites, can be supported on the lower platform assembly and without assistance from the center post. An additional subplurality of between about 2–6 satellites can also be supported on the upper platform assembly, also without assistance of the center post. Each subplurality of satellites is supported on its respective platform in a "cantilever" fashion offset from the longitudinal axis of the center post. This arrangement, together with the manufacturing techniques used to manufacture the components of the dispenser, provides for minimum structural weight of the dispenser while inherently providing a design that allows jettisoning of the entire fairing of the launch vehicle during launch vehicle ascent.

The lower platform assembly generally comprises a lower platform member disposed on an edge of a lower outer cone. The terminal end of the center post opposite to the end supporting the upper platform assembly is secured to the lower platform member, which is in turn supported by at least one of the lower inner cone or lower outer cone. Outermost edges of each of the lower inner and outer cones are secured to a base ring, which is used to support the entire dispenser apparatus on a surface of a portion of the launch vehicle.

The upper platform assembly is somewhat similar to the lower platform assembly in construction and includes an upper ring, a support cone and an upper platform member. The upper platform member is secured to the upper support cone adjacent a terminal edge of the upper support cone, while an opposite terminal edge of the upper support cone is secured to the upper ring. The upper ring is in turn secured to a terminal end of the center post opposite to the end that is secured to the lower platform assembly. In this manner the upper platform assembly is spaced apart elevationally from the lower platform assembly without requiring a portion of the center post to extend outwardly of the upper platform member. Furthermore, no separate support structure, either internal or external to the fairing, is employed. This weight savings in turn allows heavier payloads to be carried by the launch vehicle. This, in turn, contributes to more cost efficient operation of the launch vehicle.

In the preferred embodiments each of the upper and lower platform members also includes a plurality of openings intended to allow access to conventional separation assemblies. The separation assemblies are used to secure a plurality of satellites on each platform member so that the satellites can be readily deployed at the appropriate time during ascent of the launch vehicle.

The preferred embodiments thus provide a lightweight spacecraft dispenser apparatus which allows the jettisoning of maximum fairing weight during launch vehicle ascent. The preferred embodiments of the dispenser apparatus of the present invention may further be assembled using widely available construction materials and conventional construction techniques.

BRIEF DESCRIPTION OF THE DRAWINGS

The various advantages of the present invention will become apparent to one skilled in the art by reading the following specification and subjoined claims and by referencing the following drawings in which:

FIG. 14 is a partial cross sectional side view of an alternative preferred arrangement for supporting the center post on the lower platform assembly;

FIG. 15 is an alternative preferred embodiment of the center post incorporating a flaring lower portion supported directly on the base ring;

FIG. 18 is a side elevational view of the center post;

FIG. 19 is an end view of the center post of FIG. 18;

FIG. 20 is a top plan view of the upper ring of the upper platform assembly;

FIG. 21 is a cross sectional side view taken in accordance with section line 21—21 in FIG. 20 of the upper ring;

FIG. 23 is a top plan view of the upper platform member;

FIG. 24 is a bottom plan view of the upper platform member of FIG. 23;

FIG. 25 is a cross sectional side view of the upper platform member taken in accordance with section line 25—25 in FIG. 23; and FIG. 26 is a cross sectional side view of the upper platform member showing it supported on the upper cone.

DETAILED DESCRIPTION OF THE PREFERRED EMBODIMENTS

Figure 1:
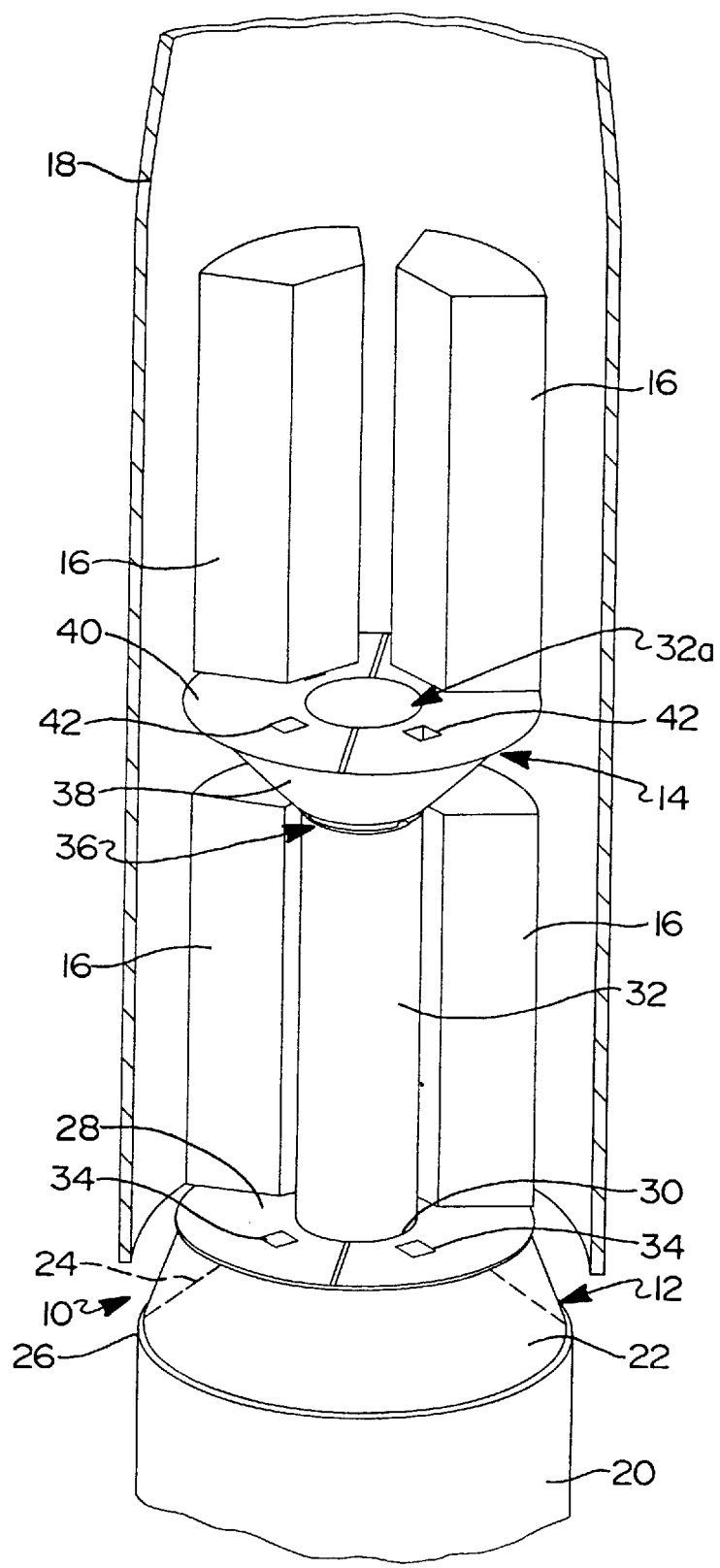
FIG. 1 is a perspective view of a satellite dispenser apparatus in accordance with a preferred embodiment of the present invention illustrating two satellites secured on a lower platform assembly and two satellites secured on an upper platform assembly of the apparatus.

Referring to FIG. 1, there is shown a cantilever, bi-level platform satellite dispenser apparatus 10 in accordance with a preferred embodiment of the present invention. The dispenser apparatus 10 generally comprises a lower platform assembly 12 and an elevationally spaced apart upper platform assembly 14. Mounted on the lower platform assembly 12 may be anywhere from about 1–6 or more independently deployable spacecraft in the form of satellites 16. Similarly, mounted on the upper platform assembly 14 is also a plurality of between about 1–6 or more additional, independently deployable satellites 16. The full weight of each satellite 16 is supported by its associated platform assembly 12 or 14. The entire dispenser apparatus 10 may be enclosed within a fairing 18 which can be jettisoned at a desired time during the ascent of a launch vehicle 20 upon which the entire dispenser apparatus 10 and fairing 18 are mounted.

The lower platform assembly 12 generally comprises a lower outer support cone 22, a lower inner support cone 24 disposed within the interior area of outer cone 22, a base ring 26 and a lower platform member 28. Projecting through a coaxially disposed opening 30 in the lower platform member 28 is an elongated center post 32. A plurality of openings 34 in the lower platform member 28 further enable access to conventional separation assemblies (not shown) which assist in deploying each of the satellites 16 at the proper time during ascent of the launch vehicle 20.

With further reference to FIG. 1, the upper platform assembly 14 is secured at an upper terminal end 32a of the center post 32. The upper platform assembly 14 generally includes an upper ring 36, an upper cone 38 and an upper platform member 40. The upper platform member 40 also includes a plurality of openings 42 for enabling access to an additional plurality of conventional separation assemblies (not shown) which assist in independently deploying the satellites 16 secured to the upper platform member 40. The satellites 16 are supported at positions exteriorly of the center post 32 and therefore offset from the longitudinal axis of the center post 32 in a "cantilever" fashion. Using a relatively narrow center post 32 and supporting the satellites 16 as shown allows the weight of the center post 32 to be reduced significantly. Previous dispenser systems have incorporated large diameter posts and disposed the satellites being carried on the lower level platform within the interior of the center post. This significantly increases the weight and cost of the center post component and further restricts the size and arrangement of the satellites being supported on the lower platform level, in addition to significantly impeding access to the lower level satellites. The dispenser apparatus 10 permits substantially full access to the satellites 16 even after they are mounted on their associated platform assemblies 12 and 14.

It will be appreciated immediately that the dispenser apparatus 10 is intended to be of suitable dimensions to enable it to support preferably at least about 1–6 satellites 16 on the upper platform assembly 14 and at least an additional 1–6 satellites 16 on the lower platform assembly 12. Accordingly, the diameter of each platform member 28 and 40 is specifically suited to the number of satellites that need to be supported thereon. Additionally, the overall length of the center post 32 may vary considerably depending upon the height of the satellites 16 being supported on the lower platform assembly 12.

Figure 2:
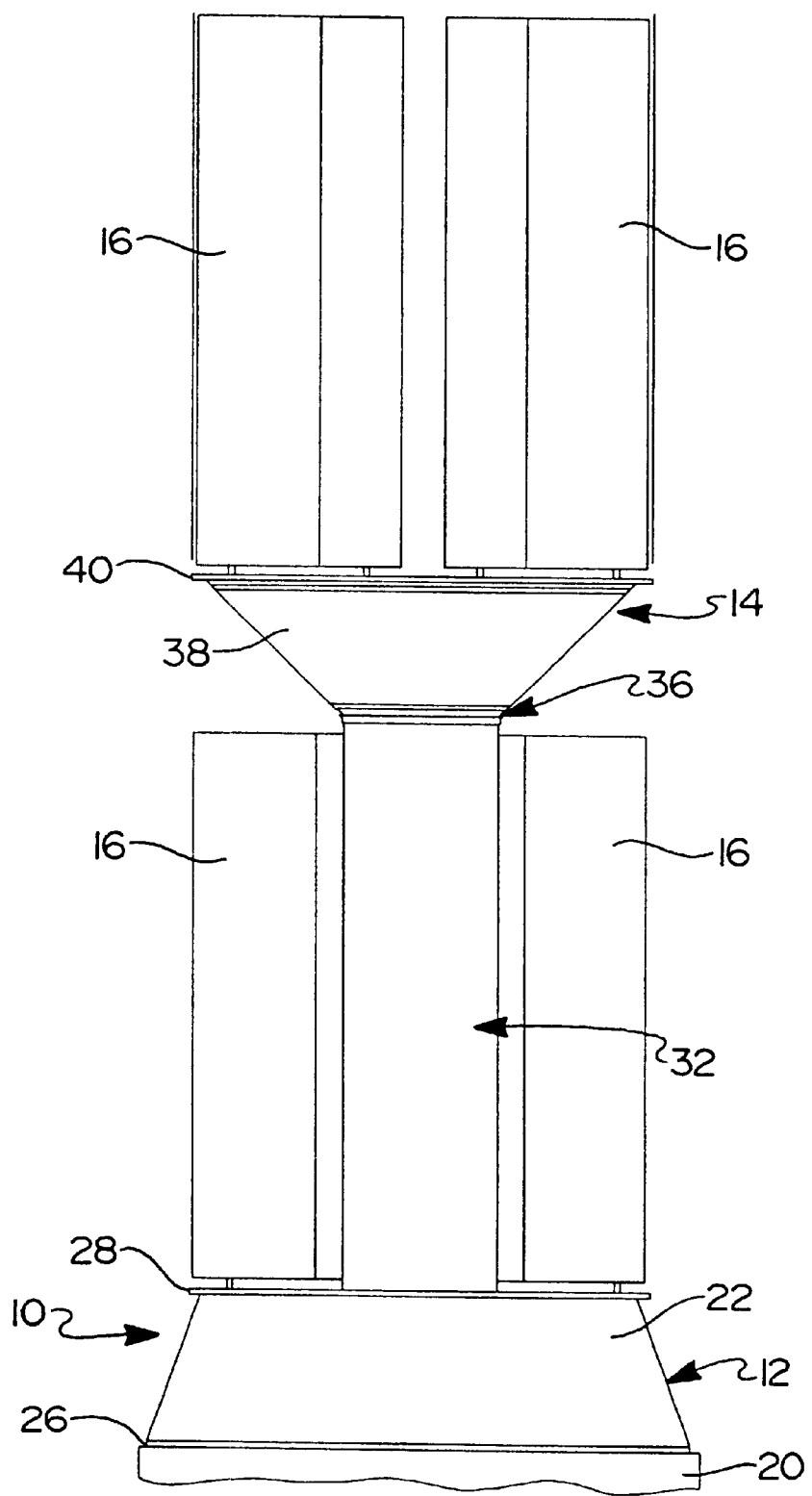
FIG. 2 is a side view of the satellite dispenser of FIG. 1.
Figure 3:
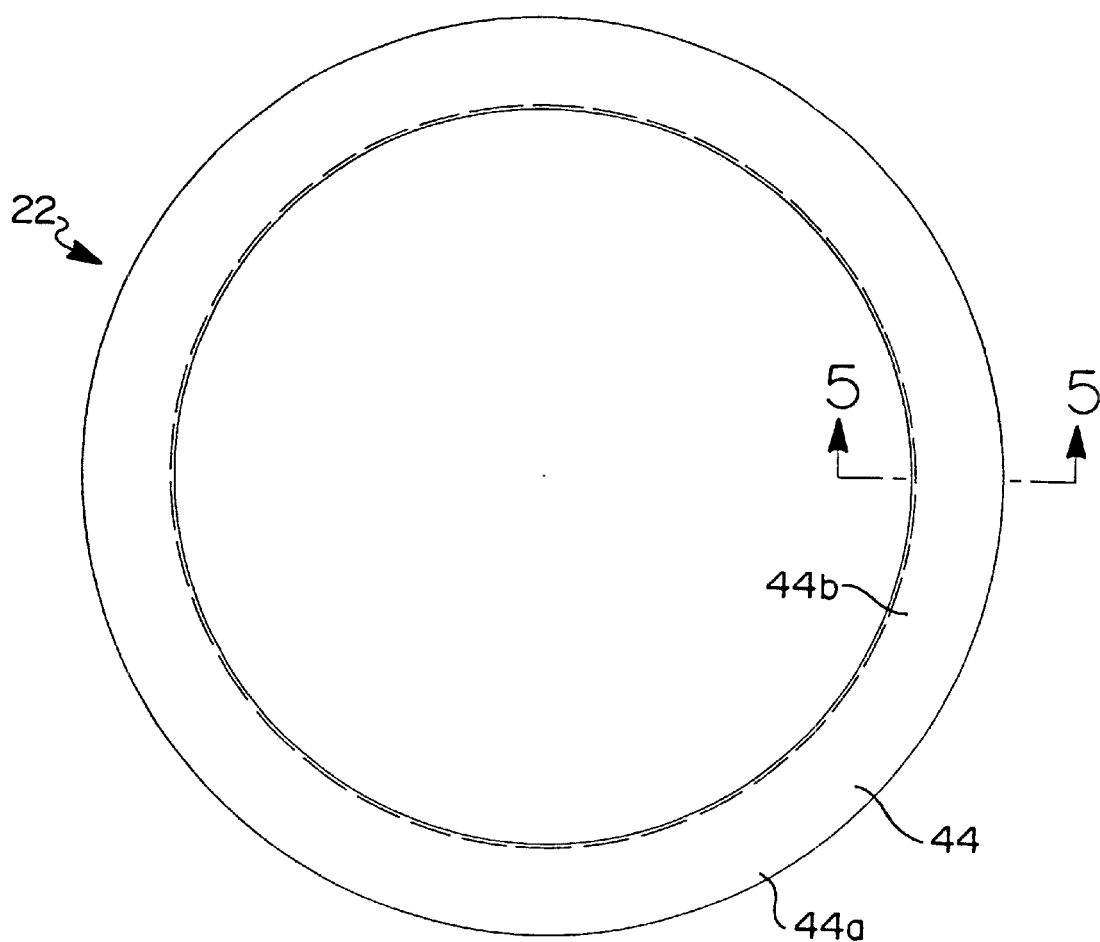
FIG. 3 is a plan view of the lower outer cone of the lower dispenser assembly.
Figure 4:
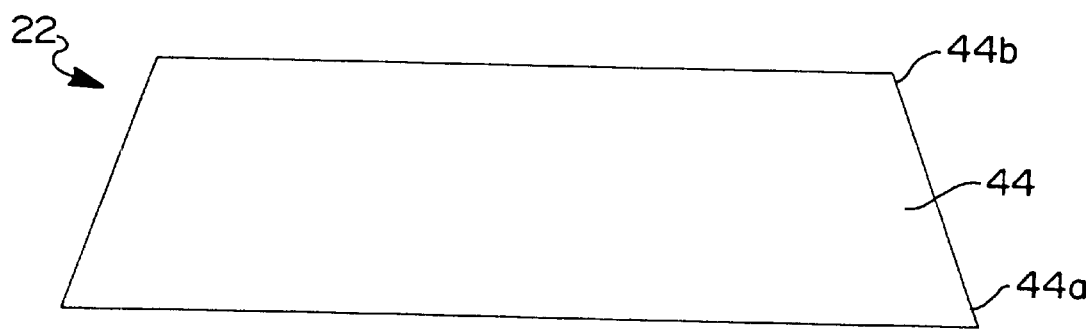
FIG. 4 is a side view of the lower outer cone of FIG. 3.

Referring now to FIGS. 2–4, the construction of the lower outer cone 22 can be seen in greater detail. The lower outer cone 22 is preferably a single piece component formed by a continuous, circular side wall 44, and preferably formed of sandwich composite construction. The circular side wall 44 has a lower edge 44a and an upper edge 44b. It will be appreciated, however, th could vary depending upon the requirements of a specific application.

Figure 5:
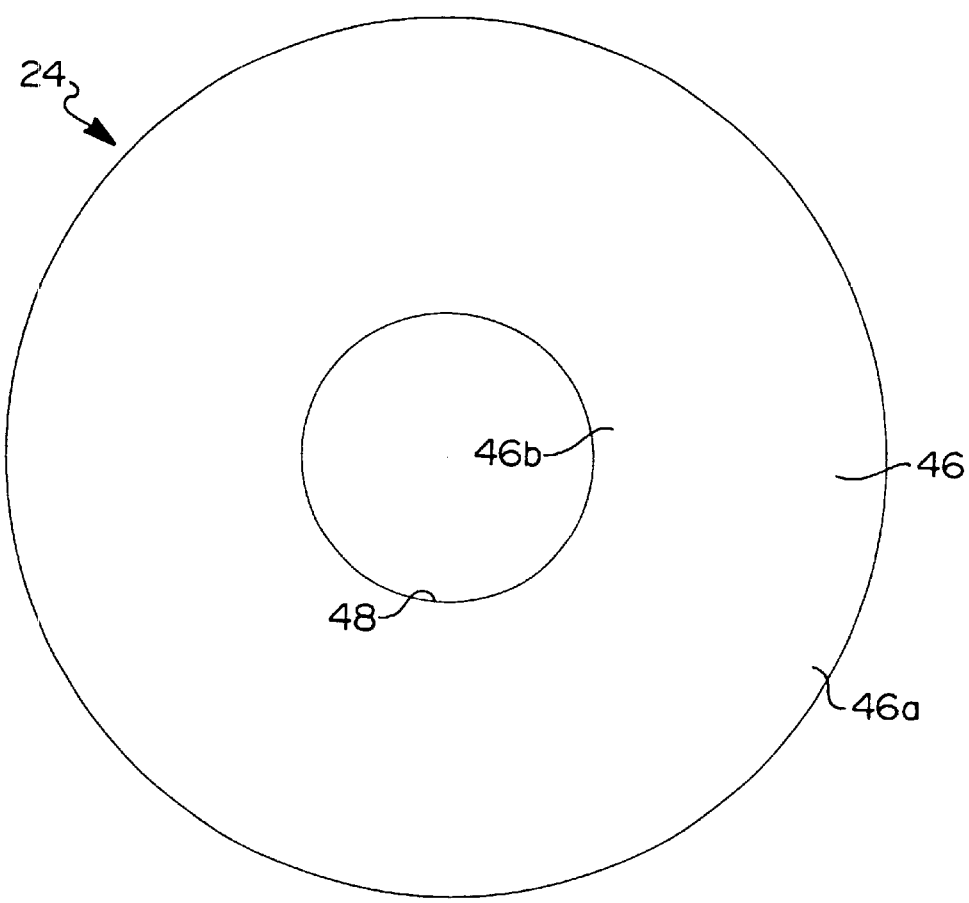
FIG. 5 is a top plan view of the lower inner cone of the lower platform assembly.
Figure 6:
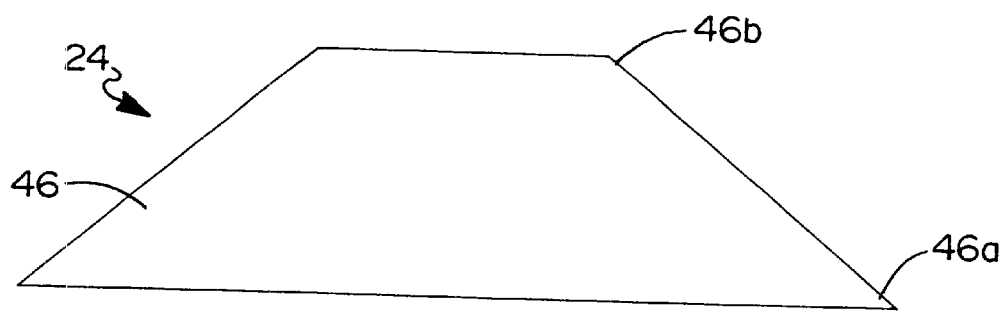
FIG. 6 is a side view of the lower inner cone of FIG. 5.

Referring now to FIGS. 5 and 6, the lower inner cone 24 can be seen. This cone is also formed as a single piece component from a continuous sidewall portion 46. The sidewall portion 46 forms a diameter at lower portion 46a which is slightly smaller than the diameter of the lower edge 44a of the lower outer cone 22. An opening 48 is formed at an upper portion 46b of the wall portion 46 which is preferably just slightly larger in diameter than the outer diameter of the center post 32. The wall portion 46 further includes a taper which is preferably between about 30–60° from the vertical. Again, it will be appreciated that the precise degree of this taper is not critical to the functioning of the lower inner cone 24.

Figure 7:
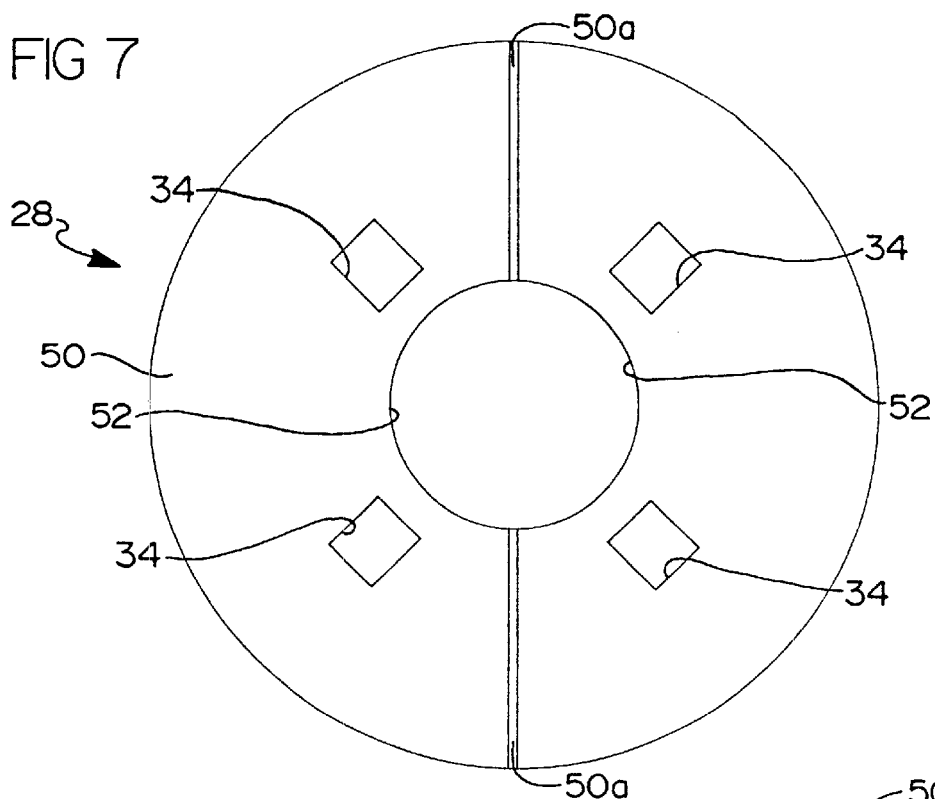
FIG. 7 is a top plan view of the lower platform member of the lower platform assembly.
Figure 9:
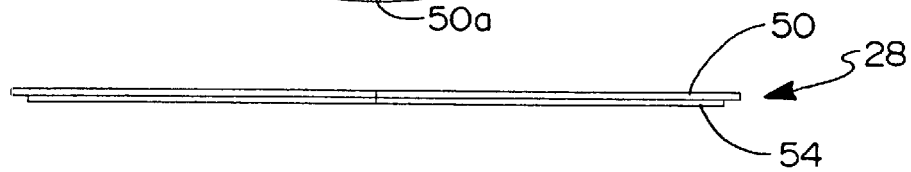
FIG. 9 is a side view of the lower platform member of FIG. 7.
Figure 8:
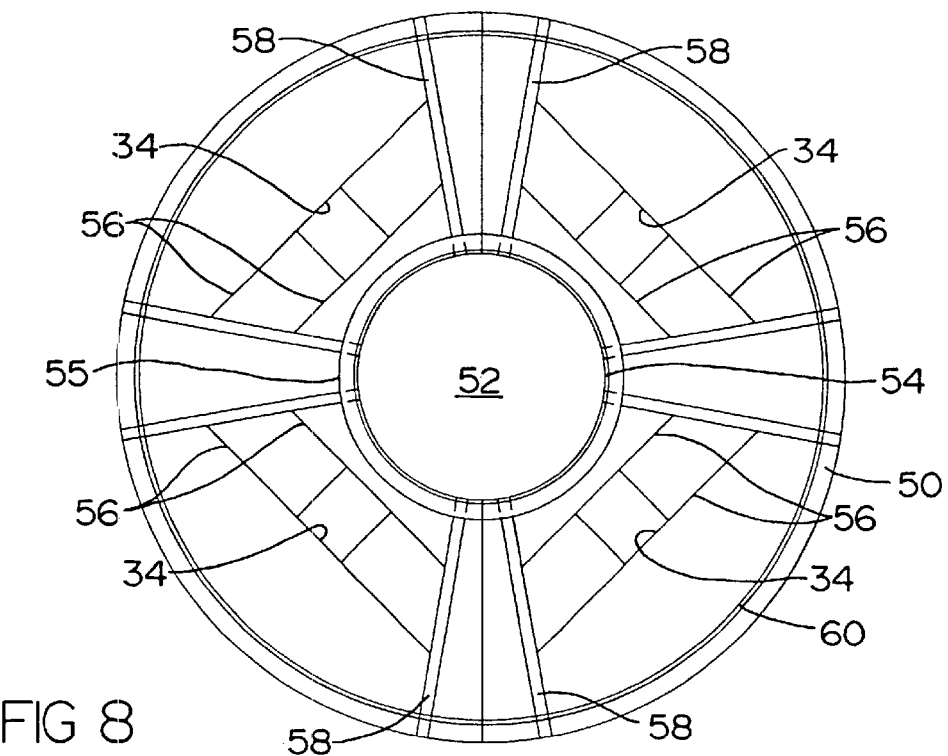
FIG. 8 is a bottom plan view of the lower platform member of FIG. 7.

Referring to FIGS. 7–9, the lower platform member 28 can be seen in greater detail. This component includes a generally planar surface 50 formed in two pieces and coupled by splice elements 50a. A central opening 52 is included and is suitably large to enable the center post 32 to project therethrough.

In FIG. 8 the lower platform member 28 can also be seen to include an inner flange 54 angled normal to the planar surface 50, an outwardly angled intermediate flange 55, and an outwardly angled outer annular flange 60. A plurality of structural webs 56 and 58 cooperatively help to provide structural strength and rigidity thereto. The annular outer flange 60 intersects the webbing 58 and further reinforces the platform 28 at the areas immediately adjacent the opening 52. The outer flange also forms a means by which the upper edge 44b of the lower outer cone can secure to the upper platform member 28. The lower platform member 28 is preferably formed by machining out of aluminum or another suitable strong, lightweight material. A single piece planar surface 50 could potentially be employed, but it is anticipated that for ease of manufacturing a two piece configuration will be most preferred.

Figure 10:
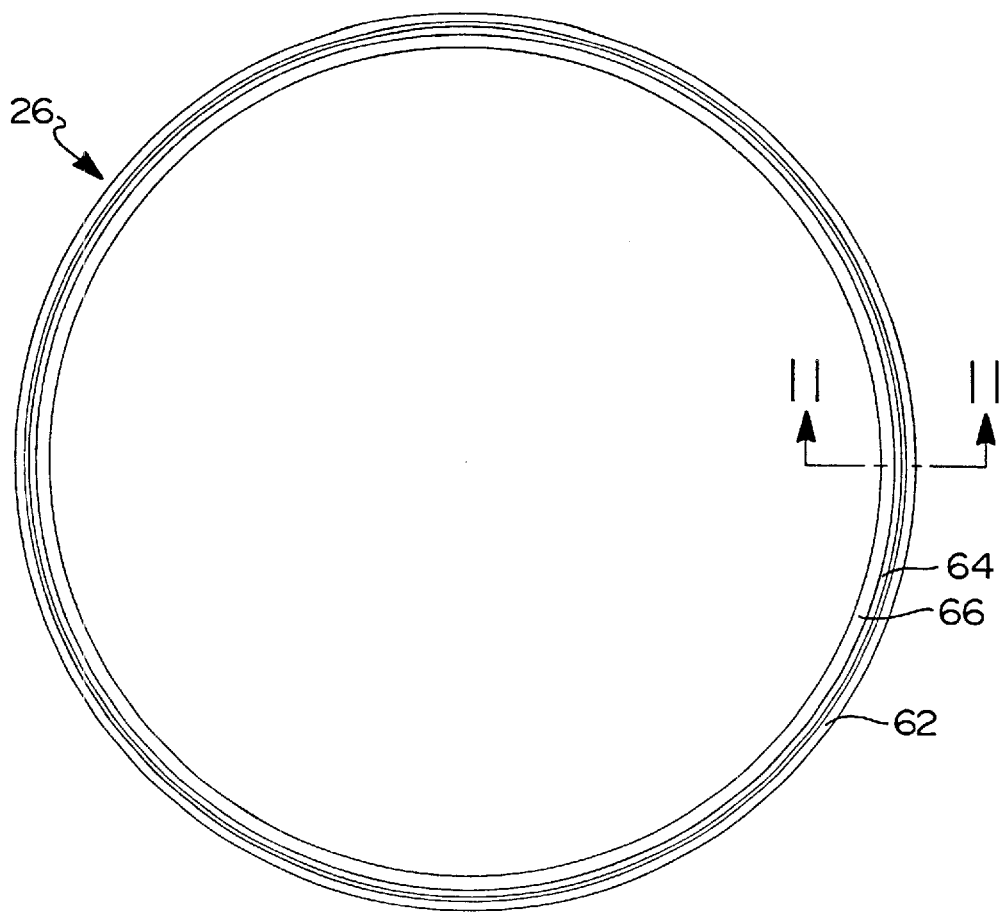
FIG. 10 is a top plan view of the base ring of the lower platform assembly.
Figure 11:
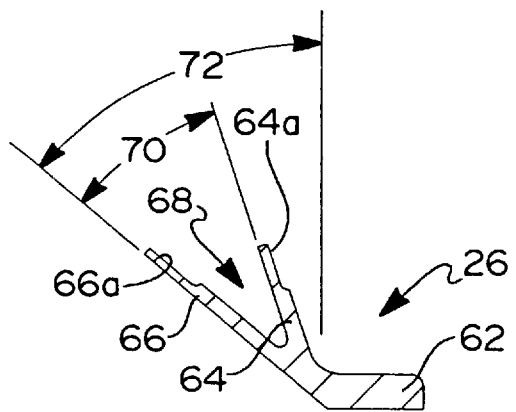
FIG. 11 is a cross sectional view of a portion of the base ring of FIG. 10 taken in accordance with section line 11—11 in FIG. 10.
Figure 12:
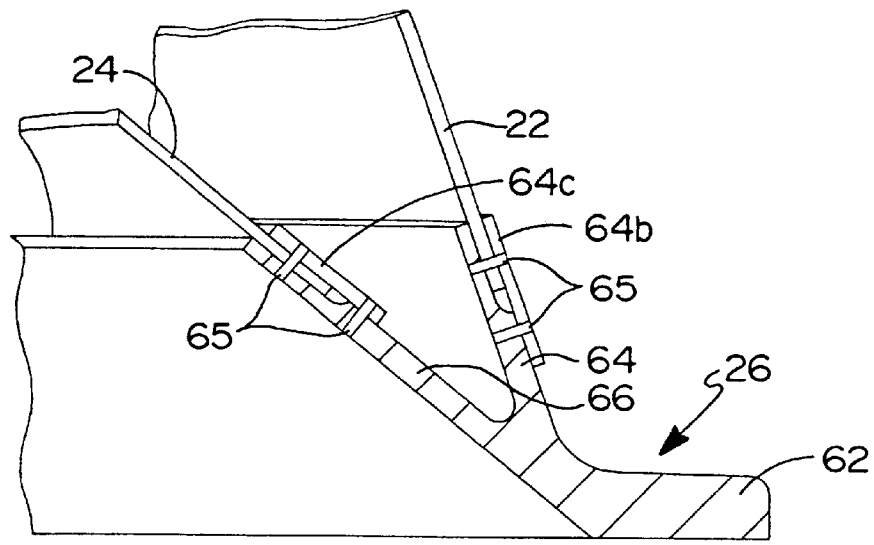
FIG. 12 is a partial cross sectional side view of the lower platform assembly showing the base ring secured to the lower edges of the lower inner and lower outer cones.

Referring now to FIGS. 10–12, the base ring 26 can be seen. The base ring 26 is preferably machined from aluminum or another suitably lightweight and structurally strong material and includes a lower flange portion 62 which is integrally formed with an outer lip 64 and an inner lip 66. Each of the outer and inner lips 64 and 66, respectively, further preferably include relief portions 64a and 66a, respectively. The outer lip 64 and inner lip 66 cooperatively form an annular, V-shaped groove 68 around the entire circumference of the base ring 26. In FIG. 11, the angle of the outer lip 64, as indicated by arrow 70, preferably matches the taper of the lower outer cone 22. The relief portion 64a of the outer lip 64 is preferably just slightly smaller in diameter than that of the lower edge 44a of the lower outer cone 22. In this manner, the lower edge 44a may be disposed against the relief portion 64a and attached thereto. The angle of the inner lip 66, as indicated by arrow 72, preferably matches the degree of taper of the lower inner cone 24, and its diameter is just slightly smaller than the diameter of the lower edge 46a of the lower inner cone 24 such that the lower edge 46a thereof may be inserted over the relief portion 66a.

Referring further to FIG. 12, the lower inner cone 24 and the lower outer cone 22 are preferably secured to the relief portions 64 and 66 by double lap splices utilizing splice elements 64b and 64c and fasteners 65. It will be appreciated, however, that other suitable forms of attachment could also be used.

Figure 13:
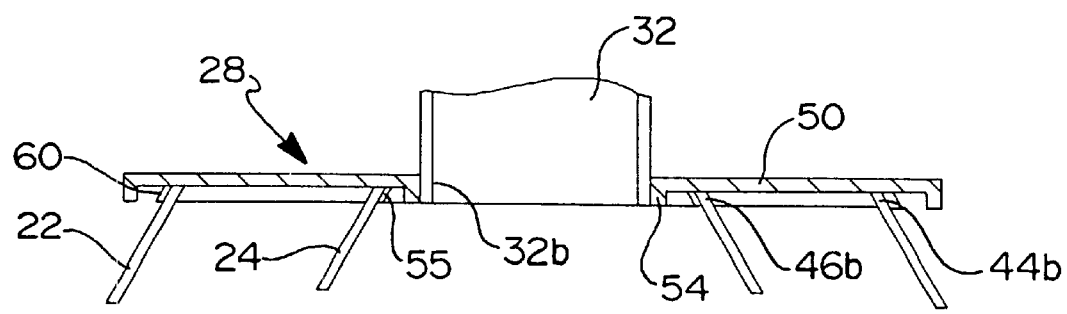
FIG. 13 is a cross-sectional side view showing the attachment of the lower platform member to the lower portion of the center post, as well as to the upper edges of the lower inner and lower outer support cones.

With brief reference to FIG. 13, the attachment of the center post 32 to the lower platform member 28, as well as the attachment of the upper edges 46b, 44b of the lower inner 24 and lower outer 22 cones, respectively, can be seen. A lower edge 32b of the center post 32 is secured to the annular flange 54 of the lower platform member 28 by suitable fasteners (not shown). The upper edges 46b and 44b of cones 24 and 22, respectively, are secured by suitable fasteners (not shown) to the flanges 55 and 60, respectively.

It will be appreciated that modifications could be made to the center post 32 to provide even greater structural strength. For example, the length of the center cone 32 could be extended slightly and the lower edge 32b thereof attached via a splice element 33 to the inner cone 24, as shown in FIG. 14. Alternatively, the center post 32 could be formed as a filament wound component with an integrally formed, outwardly flaring lower portion 32' that functions in place of the inner cone 24, as shown in simplified form in FIG. 15. These arrangements would even further increase the load carrying capability of the center post 32.

Figure 16:
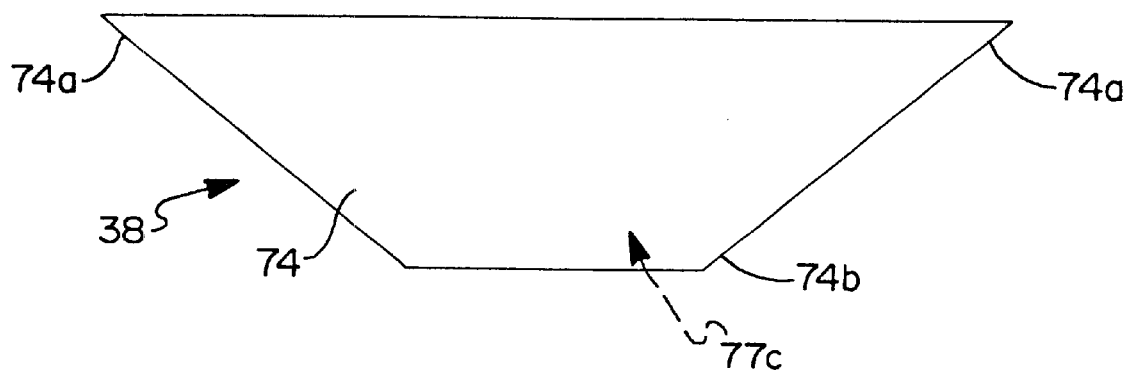
FIG. 16 is a side elevational view of the upper support cone.
Figure 17:
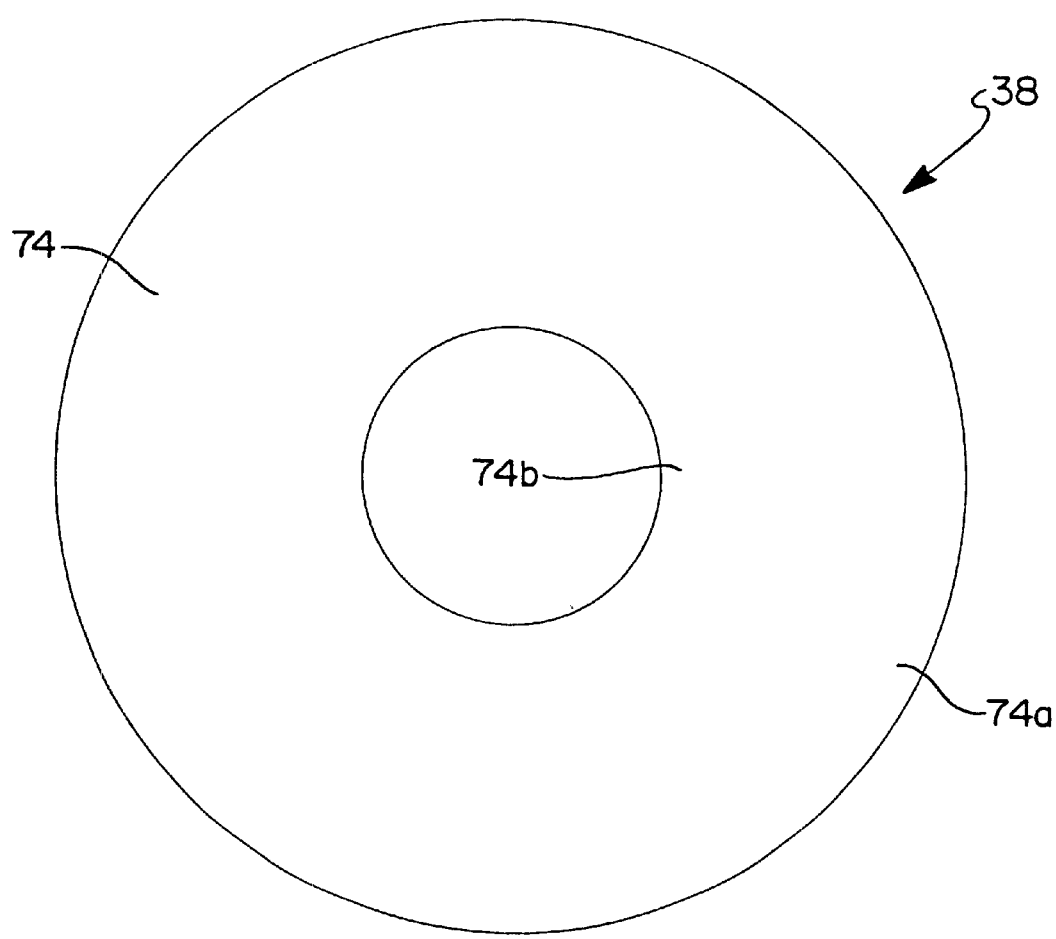
FIG. 17 is a top plan view of the upper support cone.

Referring to FIGS. 16 and 17, the upper support cone 38 is shown. The upper support cone 38 is also preferably formed as a single piece component from sandwich composite construction and forms a frustoconical-shaped cone. A continuous wall portion 74 defines an upper edge 74a and an opening 77c at a lower edge 74b of the wall portion 74. The degree of taper of the wall portion 74 may also vary considerably, but is preferably in the range of about 30–60° from the vertical.

In FIGS. 18 and 19, the center post 32 is shown in greater detail. The center post 32 is preferably of solid graphite epoxy construction and forms an extremely rigid, structurally strong and yet lightweight component. The thickness of the material forming the center post 32 may vary considerably, but in one preferred embodiment is preferably between about 48–84 inches (1.22–2.14 m). The overall length of the center post 32 may also vary considerably depending upon the configuration and overall dimensions of the satellites 16 being supported on the dispenser apparatus 10.

Referring now to FIGS. 20 and 21, the upper support ring 36 can be seen in greater detail. The upper support ring 36 is preferably machined out of a solid piece of aluminum or other structurally strong yet lightweight material. The upper support ring 36 includes a base portion 75 and an angled flange 76. The flange 76 has a relief portion 78 and a leg 76a. The diameter of the opening formed by the base portion 75, as indicated by dimensional arrow 81 in FIG. 20, is preferably just slightly larger than the outer diameter of the center post 32 such that the center post can extend therethrough. The angle of the flange 76 preferably matches the angle of the upper support cone 38 such that the edge portion 74b of the upper support cone 38 can rest flush in the relief portion 78.

Figure 22:
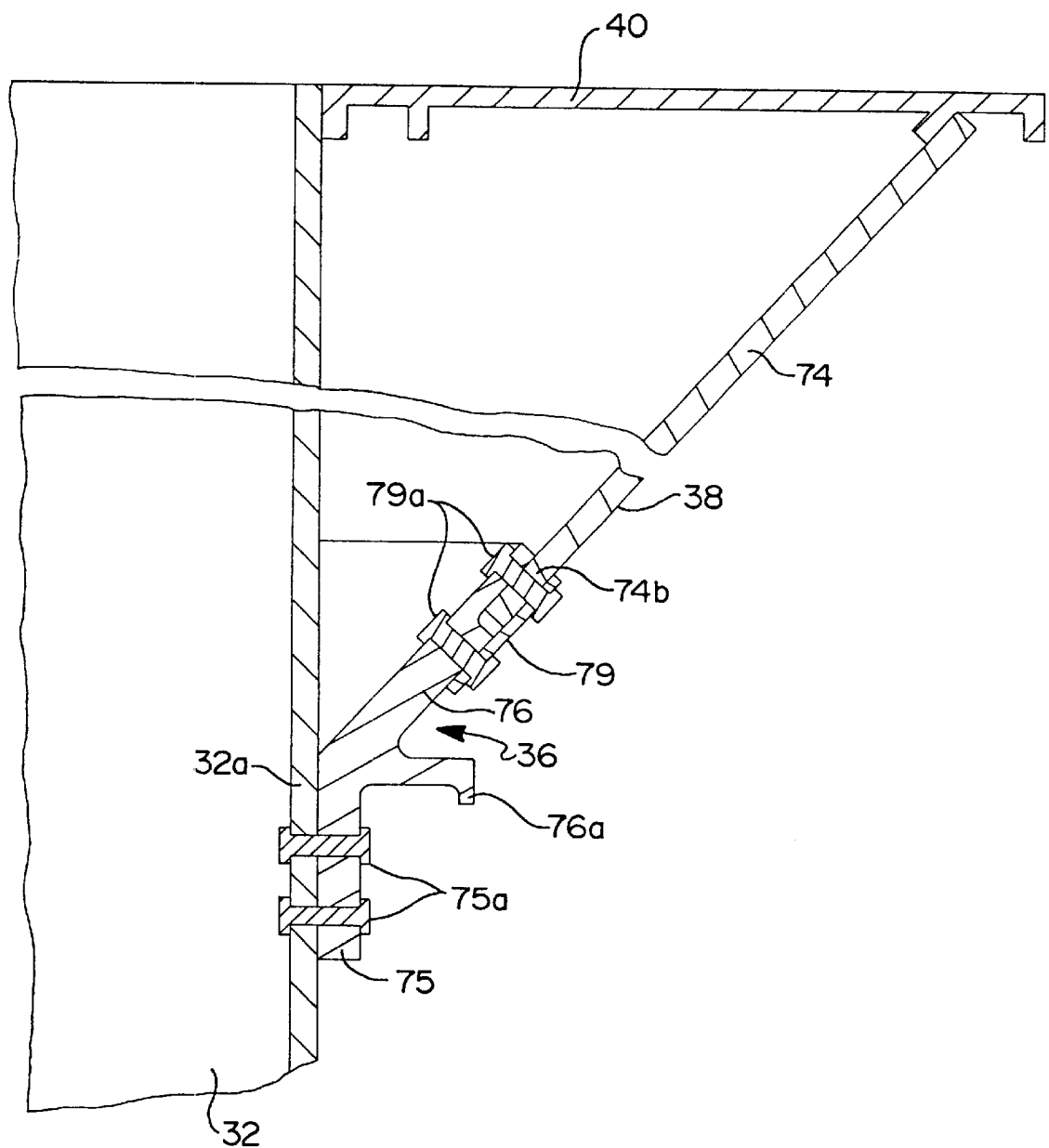
FIG. 22 is a fragmentary, cross sectional side view of the upper ring securing the upper cone to the center post.

Referring to FIG. 22, the upper cone 38 is preferably secured to the upper support ring 36 by a double lap splice with a plurality of splice elements 79 and fasteners 79a circumferentially around flange 76. The base portion 75 is secured with fastening elements 75a to the center post 32.

Referring now to FIGS. 23–25, the upper platform member 40 can be seen in greater detail. The upper platform member 40 includes splice components 82 for securing the two halves which comprise the upper platform member 40 together to form a structurally strong and rigid component. A coaxial opening 84 is also defined which is preferably just slightly larger than the outer diameter of the center post 32. The upper platform member 40 also includes an outer annular flange 86 and an inner annular flange 88. With specific reference to FIG. 24, a plurality of support webs 90 are formed adjacent the access openings 42 to provide further structural strength to these areas. Similarly, a plurality of radially outwardly extending support webs 92 are formed to help provide additional structural strength to the upper platform member 40 at the areas where portions of the satellites 16 are expected to rest once mounted on the upper platform member 40. The upper platform member 40 is preferably machined from aluminum or another lightweight yet structurally strong material. As with the lower platform member 28, the upper platform member 40 may also be formed as a single piece component from a single piece of aluminum, thus obviating the need for splice elements 82. It is expected, however, that in most instances it will be easier to manufacture the member 40 from two pieces of aluminum rather than a single piece.

Referring to FIG. 26, the upper platform member 40 can be seen attached to the upper cone 38. The upper platform member 40 is secured to edge 74a of the upper cone 38 by suitable fasteners (not shown) such that the edge 74a fits against the outer annular flange 86.

Once completely assembled, the dispenser apparatus 10 forms a means by which a relatively large plurality of independently deployable satellites can be supported in a manner minimizing the overall weight of the dispenser. The dispenser apparatus 10 thus allows a greater payload capability for dual platform type support arrangements than previously developed dispensers, which require additional support structure (either internal of or external to the fairing) to support the payload in a dual platform configuration. Advantageously, the full weight of each of the satellites 16 is supported by its associated platform assembly 12 or 14. The dispenser apparatus 10 is significantly lighter in weight than previous dispenser designs and, importantly, permits substantially unimpeded access to the satellites 16 after same are secured to the dispenser 10.

It will also be appreciated that even further structural stiffness may be imparted to the dispenser apparatus 10 by employing passive dampers attached to the inner surface of the fairing 18, if such additional structural rigidity is required. It is anticipated that such additional structural stiffness will only be required for relatively long spacecraft or applications where the center post 32 is significantly greater in length than about 20 feet (6.1 meters).

The dispenser apparatus 10 can further be manufactured from widely available materials using readily available construction techniques. The dual platform arrangement implemented by the dispenser 10 enables the entire fairing 18 to be jettisoned at the appropriate time during ascent of the launch vehicle 20 to thus maximize the amount of payload that may be placed into low earth orbit. Since no portion of the fairing 18 is carried into low earth orbit, the likelihood of any damage by orbital debris to the satellites 16, once deployed, is eliminated.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A space vehicle dispenser apparatus for supporting a plurality of independently deployable spacecraft in a dual platform configuration to permit jettisoning of a full fairing of a space vehicle during ascent of the space vehicle, said apparatus comprising:

a first platform for supporting a first subplurality of said spacecraft thereon;

a post extending generally orthogonally from said first platform;

a second platform spaced elevationally apart from said first platform and supported by said post, said second platform operating to support a second subplurality of said spacecraft thereon; and wherein said first platform comprises a lower support cone assembly for supporting said center post.

2. The apparatus of claim 1, wherein said lower support cone assembly comprises:

a frustoconical shaped inner support cone; and a frustoconical shaped outer support cone covering said inner support cone.

3. The apparatus of claim 1, wherein said lower support cone assembly comprises:

a frustoconical shaped inner support cone;

a frustoconical shaped outer support cone disposed so as to cover said inner support cone; and a base ring for engaging an edge of each of said inner and outer support cones.

4. The apparatus of claim 3, wherein said first platform is supported by at least one of said outer or inner support cones.

5. The apparatus of claim 1, further comprising:

a frustoconical shaped upper support cone operably associated with said post for supporting said second platform thereon.

6. The apparatus of claim 5, further comprising an upper support ring coupled to said post for supporting said upper support cone thereon.

7. The apparatus of claim 1, wherein each of said first and second platforms include a plurality of openings formed therein to provide access to separation assemblies used in securing said subpluralities of said spacecraft thereto.

8. A satellite dispenser apparatus for supporting a plurality of independently deployable satellites in a dual platform arrangement to permit jettisoning of a full fairing of a space vehicle which encloses said dispenser apparatus at the appropriate time during ascent of said space vehicle, said apparatus comprising:

a first, generally horizontally disposed platform assembly for supporting a first subplurality of said satellites thereon;

a post extending generally coaxially with, and outwardly from, said first platform assembly;

said first plurality of satellites being adapted to be supported on said first platform assembly at positions exteriorly of said post;

a second, generally horizontally disposed platform assembly spaced elevationally apart from said first platform assembly and supported on said post adjacent an end of said post, said second platform assembly operating to support a second subplurality of said spacecraft thereon at a position above said fist platform assembly; and each of said first and second platform assemblies including a plurality of openings formed therein to provide access to separation assemblies used in securing said subpluralities of said spacecraft thereto.

9. The apparatus of claim 8, wherein said first platform assembly comprises:

a frustoconical shaped inner support cone;

a frustoconical shaped outer support cone disposed over said inner support cone; and a platform member supported by at least one of said inner and outer support cones.

10. The apparatus of claim 9, further comprising a base ring for engaging an edge of at least one of said inner and outer support cones and for supporting said first platform assembly on a surface of a launch vehicle.

11. The apparatus of claim 8, wherein said second platform assembly comprises:

a support cone;

a support ring for securing said support cone to said post adjacent said terminal end of said post; and an upper platform member secured to said support cone.

12. The apparatus of claim 8, wherein said second platform assembly is disposed in coaxial alignment with a coaxial center of said post.

13. A method for supporting a plurality of independently deployable satellites on a launch vehicle in a manner that requires no support structure associated with a fairing of the launch vehicle, to thereby permit jettisoning of the fairing at the appropriate time during ascent of the launch vehicle, said method comprising the steps of:

using a first, generally horizontally disposed platform to support a first subplurality of said satellites thereon along bottom portions thereof;

using a post secured to said first platform to support a second platform elevationally apart from said first platform;

using said second platform to support a second subplurality of said satellites thereon along bottom portions thereof and exteriorly of said post; and forming a plurality of openings in each of said platforms for enabling access to separation assemblies used in securing said subpluralities of said satellites thereto.

14. The method of claim 13, wherein said step of using said second platform comprises the step of supporting said second platform generally parallel to said first platform on a terminal end portion of said post.

15. A space vehicle dispenser apparatus for supporting a plurality of independently deployable spacecraft in a dual platform configuration to permit jettisoning of a full fairing of a space vehicle during ascent of the space vehicle, said apparatus comprising:

a first platform for supporting a first subplurality of spacecraft thereon;

a post extending generally orthogonally from said first platform; and a second platform spaced elevationally apart from said first platform and supported by said post, said second platform operating to support a second subplurality of said spacecraft thereon; and wherein each of said first and second platforms include at least one opening formed to provide access to an associated separation assembly used in securing said subpluralities of said spacecraft to said platforms.

* * * * *

UNITED STATES PATENT AND TRADEMARK OFFICE
CERTIFICATE OF CORRECTION

PATENT NO.    : 6,296,206 B1  
DATED         : October 2, 2001  
INVENTOR(S)   : Chamness et al.

Page 1 of 1

It is certified that error appears in the above-identified patent and that said Letters Patent is hereby corrected as shown below:

<u>Column 5,</u>
Line 16, after "however" delete "th" and insert -- that the degree of taper --.

<u>Column 9,</u>
Line 6, "fist" should be -- first --.

Signed and Sealed this

Seventh Day of May, 2002

Attest:

JAMES E. ROGAN
*Attesting Officer*     *Director of the United States Patent and Trademark Office*